(12) United States Patent
Vanderby et al.

(10) Patent No.: US 11,608,096 B2
(45) Date of Patent: Mar. 21, 2023

(54) RAILROAD TANK CAR FITTINGS

(71) Applicant: NATIONAL STEEL CAR LIMITED, Hamilton (CA)

(72) Inventors: Max Vanderby, Hamilton (CA); Kenneth Wayne Black, Hamilton (CA)

(73) Assignee: NATIONAL STEEL CAR LIMITED, Hamilton (CA)

( * ) Notice: Subject to any disclaimer, the term of this patent is extended or adjusted under 35 U.S.C. 154(b) by 450 days.

(21) Appl. No.: 15/490,827

(22) Filed: Apr. 18, 2017

(65) Prior Publication Data
US 2018/0297618 A1 Oct. 18, 2018

(51) Int. Cl.
B61D 5/00 (2006.01)
B61H 13/02 (2006.01)
B61D 17/10 (2006.01)
B60T 7/10 (2006.01)

(52) U.S. Cl.
CPC .............. *B61H 13/02* (2013.01); *B60T 7/10* (2013.01); *B61D 5/00* (2013.01); *B61D 17/10* (2013.01)

(58) Field of Classification Search
CPC ........... B61H 13/02; B61D 5/00; B61D 17/00
See application file for complete search history.

(56) References Cited

U.S. PATENT DOCUMENTS

| | | | | |
|---|---|---|---|---|
| 2,265,178 A * | 12/1941 | Lohse | ................... | B61D 17/043 105/404 |
| 2,339,844 A * | 1/1944 | Doerr | ..................... | B61C 17/02 105/236 |
| 3,102,497 A * | 9/1963 | Candlin, Jr. | ........... | B61D 3/188 105/422 |
| 3,163,128 A * | 12/1964 | Enochian | ................. | B61G 9/16 74/505 |
| 3,256,999 A * | 6/1966 | Cope | ........................ | B61G 7/12 213/8 |
| 3,277,843 A * | 10/1966 | Horner | ..................... | B61D 5/06 105/360 |
| 3,971,491 A * | 7/1976 | Mowatt-Larssen | ......................... | B65D 88/128 220/628 |
| 4,346,790 A * | 8/1982 | Morrison | ................. | B61H 1/00 74/505 |
| 5,465,670 A | 11/1995 | Butcher | | |
| 5,520,489 A | 5/1996 | Butcher et al. | | |
| 5,730,063 A | 3/1998 | Forbes et al. | | |
| 5,743,191 A | 4/1998 | Coslovi | | |
| 5,765,485 A | 6/1998 | Thoman et al. | | |
| 5,832,839 A | 11/1998 | Forbes | | |
| 5,855,174 A | 1/1999 | Thoman et al. | | |
| 6,148,965 A | 11/2000 | Forbes et al. | | |

(Continued)

FOREIGN PATENT DOCUMENTS

CN 205311484 U * 6/2016

*Primary Examiner* — Mark T Le
(74) *Attorney, Agent, or Firm* — Whiteford, Taylor & Preston, LLP; Barry E. Bretschneider

(57) ABSTRACT

A railroad tank car may have external fittings, such as brake fittings. A low mount brake fitting is located in a recess formed in the end sill of the car or in the side sill of the car between the main bolster and the end sill. Where an end sill installation is used, the end sill may be asymmetric, with the recess being formed to one side of the center sill. Alternatively, the end sill may be offset longitudinally away from the striker, and a spacer inserted.

19 Claims, 17 Drawing Sheets

(56) References Cited

U.S. PATENT DOCUMENTS

| | | | |
|---|---|---|---|
| 6,148,966 | A | 11/2000 | Daugherty, Jr. et al. |
| 6,164,210 | A | 12/2000 | Coslovi et al. |
| 6,205,932 | B1 | 3/2001 | Khattab |
| 6,354,778 | B1 | 3/2002 | Coslovi et al. |
| 6,941,875 | B2 | 9/2005 | Norton et al. |
| 6,943,675 | B2 | 9/2005 | Petersen et al. |
| 6,976,433 | B1 | 12/2005 | Neumann |
| 8,806,994 | B2 | 8/2014 | Smith et al. |
| 8,950,341 | B2 | 2/2015 | Boring et al. |
| 8,973,508 | B2 * | 3/2015 | Al-Kaabi .................. B61D 3/14 105/404 |
| 9,663,092 | B2 | 5/2017 | Martin et al. |
| 2014/0261069 | A1 * | 9/2014 | Bis ........................... B61D 7/28 105/251 |
| 2015/0114253 | A1 * | 4/2015 | Bis ........................... B61D 7/28 105/251 |
| 2018/0297618 | A1 * | 10/2018 | Vanderby ............... B61H 13/02 |

* cited by examiner

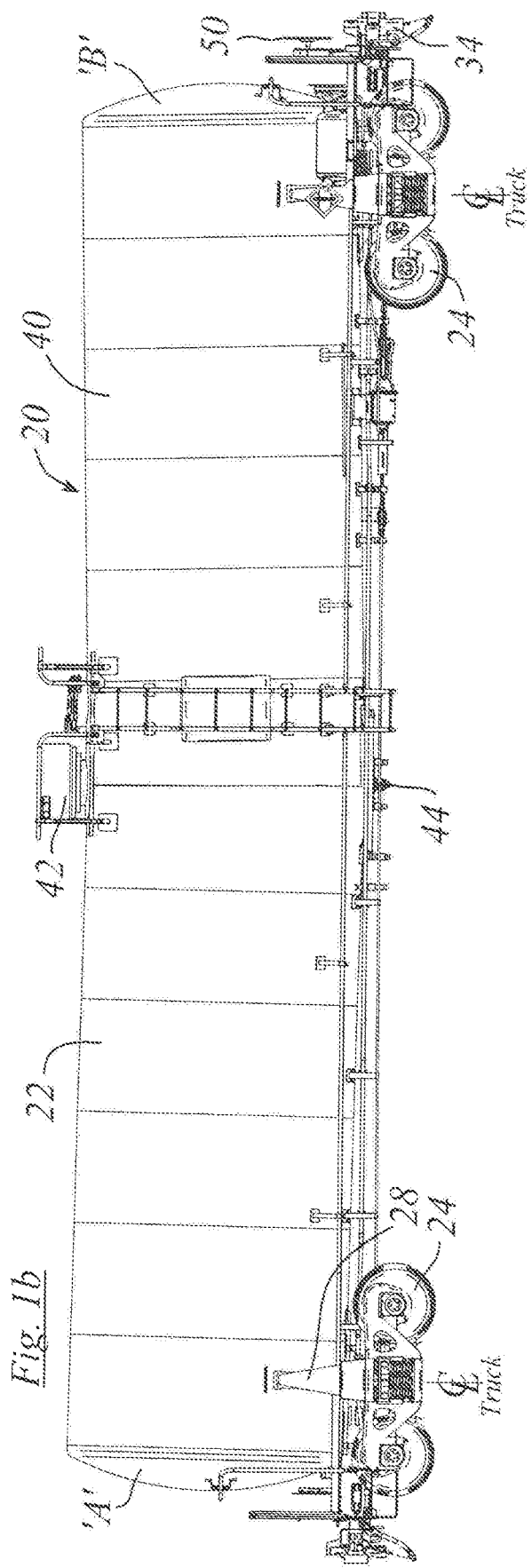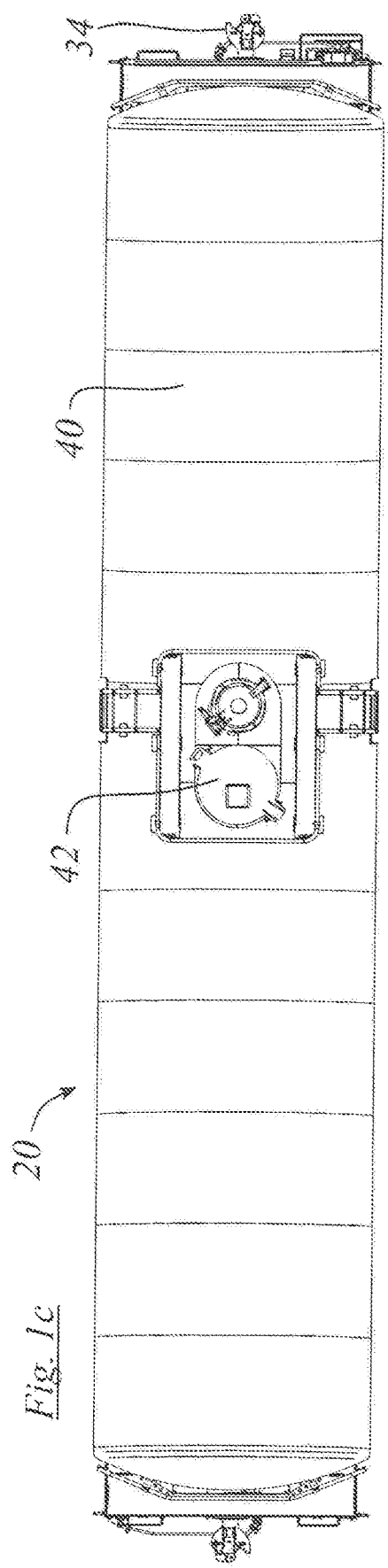

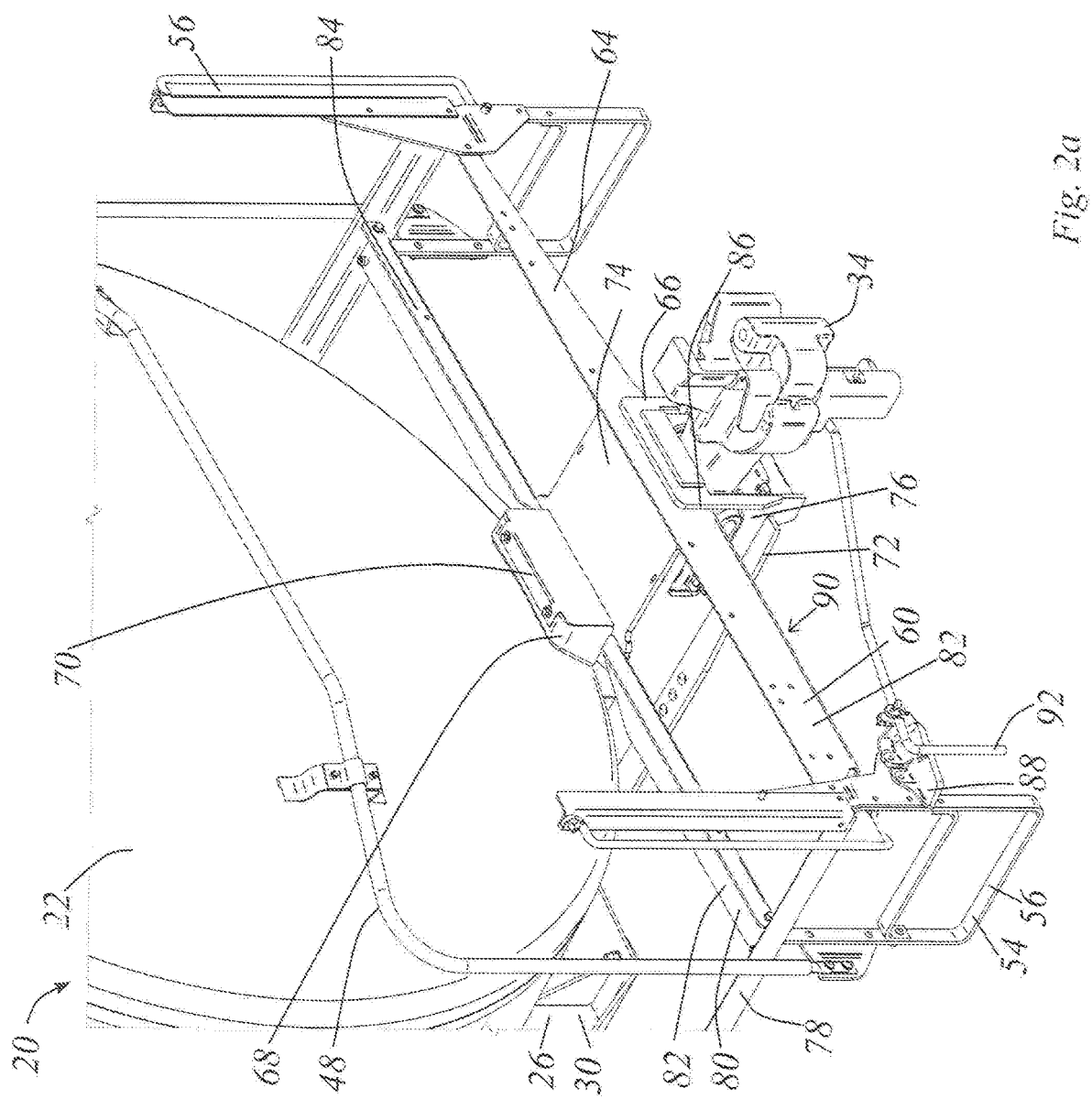

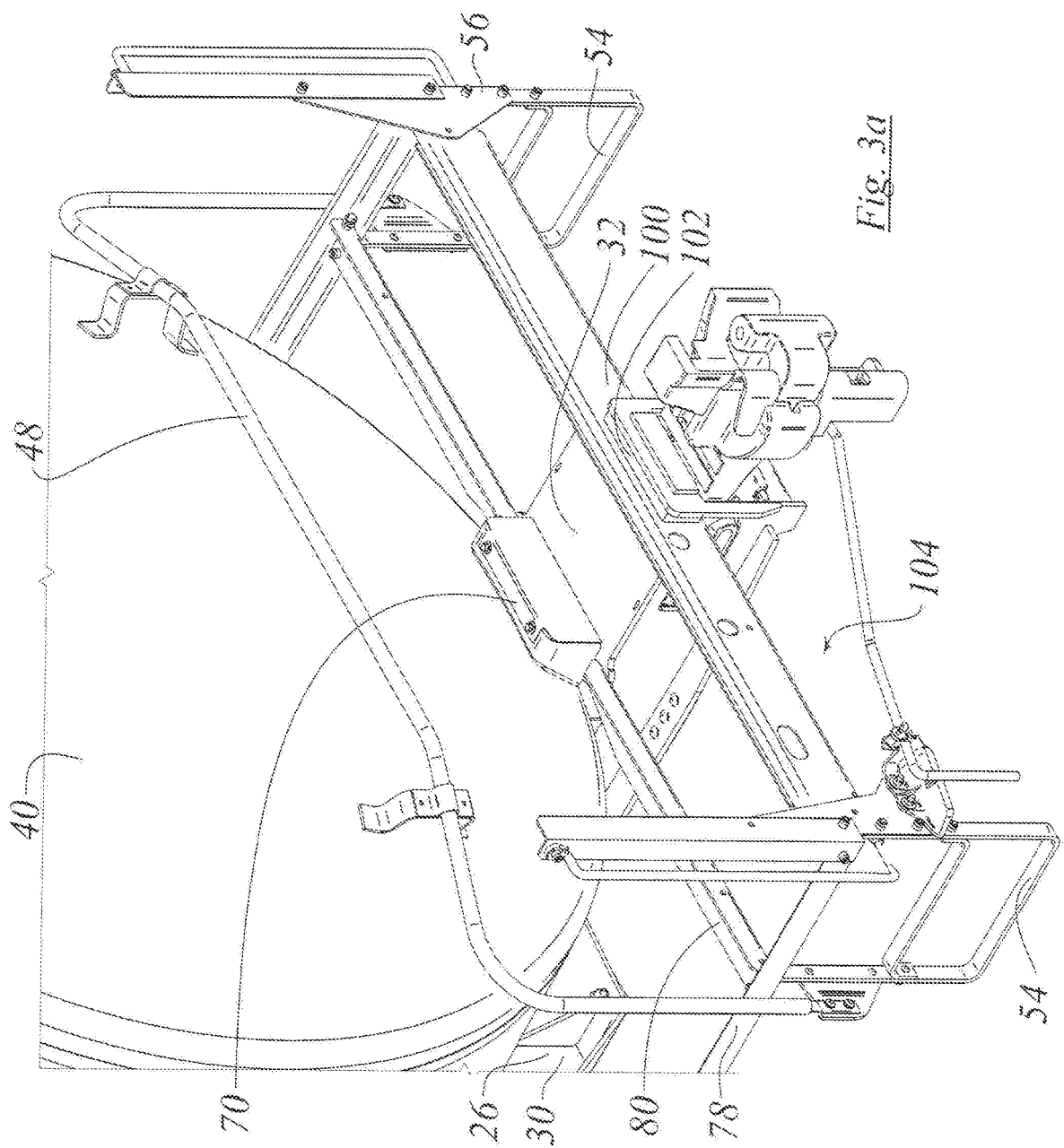

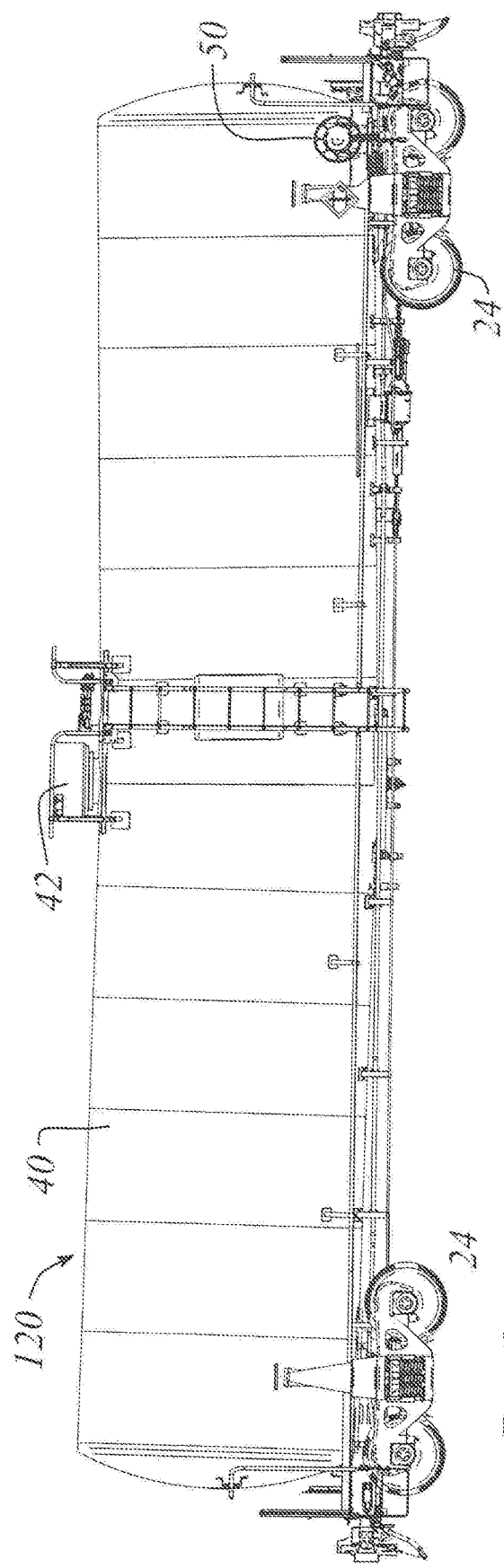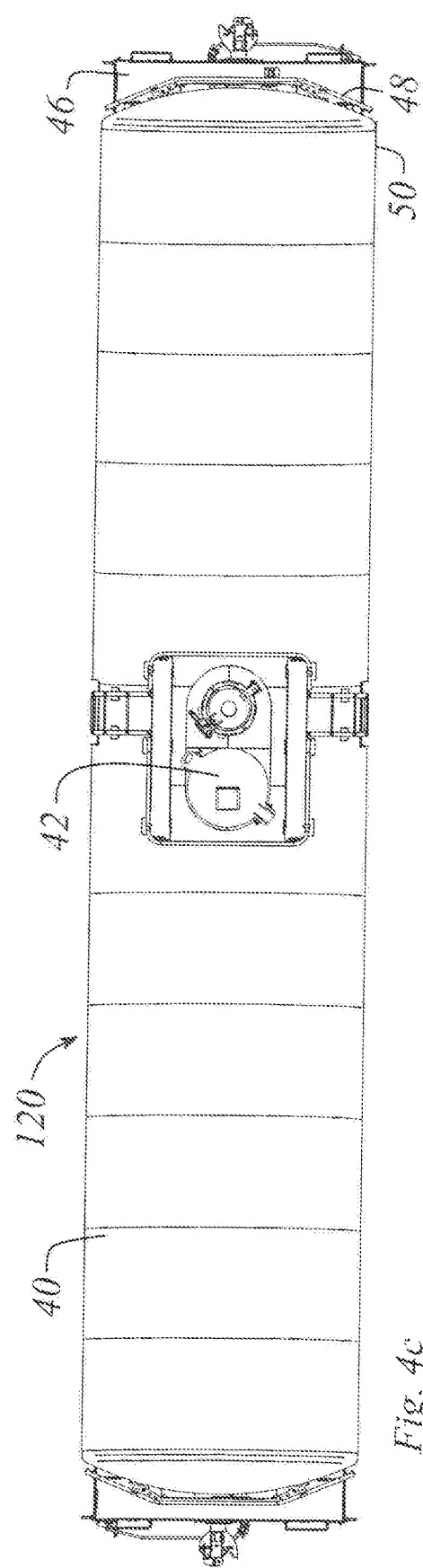
Fig. 4b
Fig. 4c

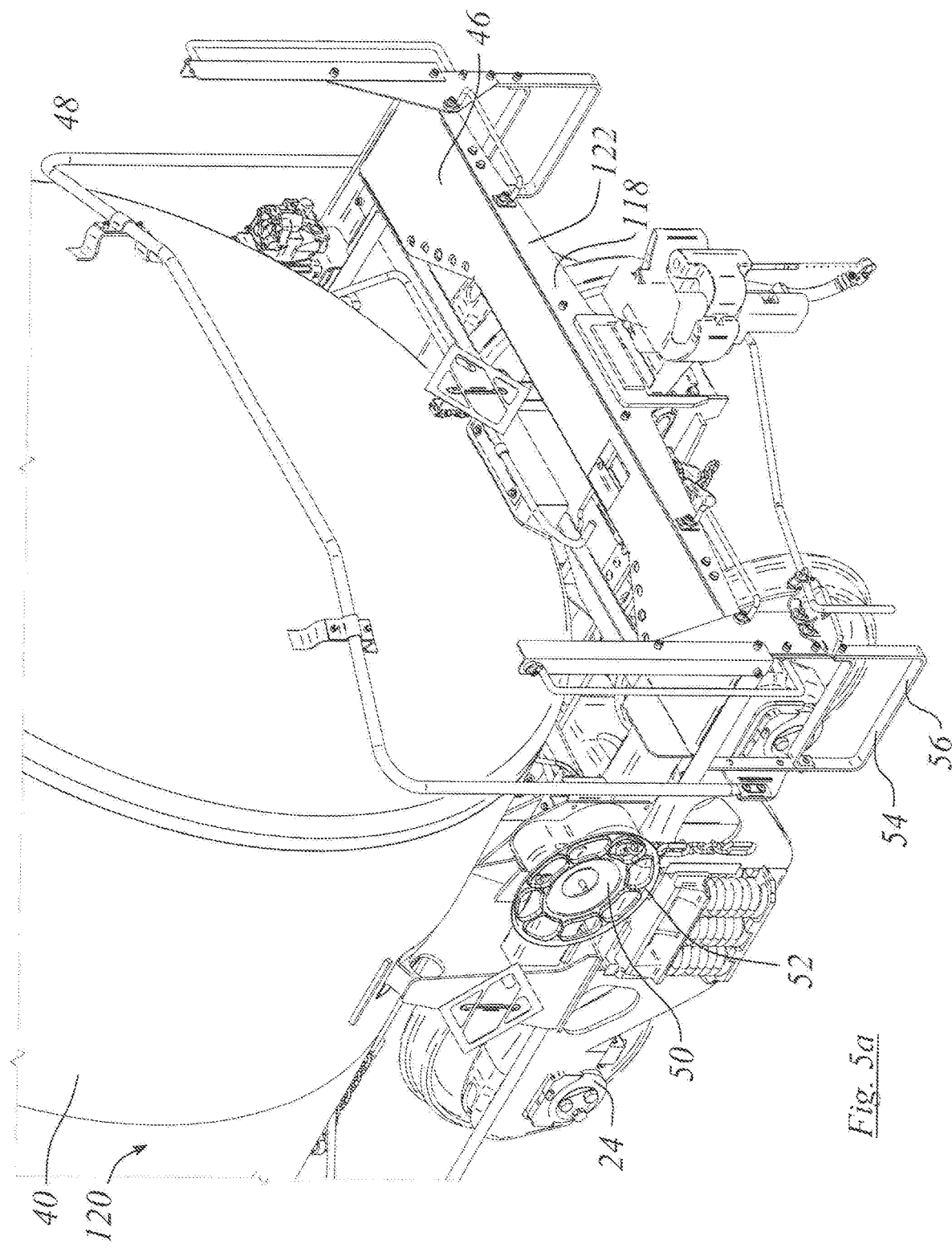

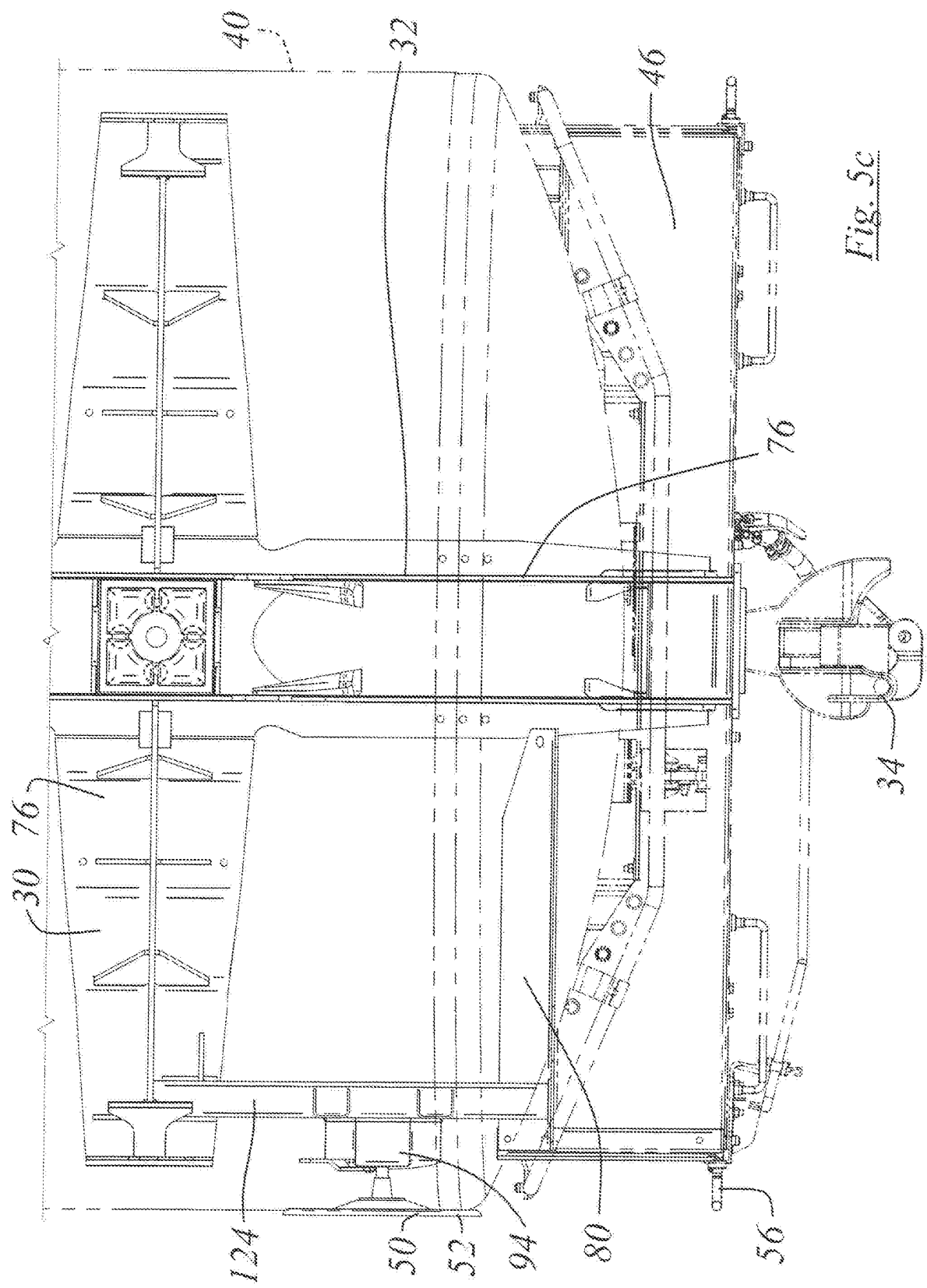

RAILROAD TANK CAR FITTINGS

FIELD OF THE INVENTION

This invention relates to the field of railroad tank cars and apparatus therefor.

BACKGROUND

Railroad tank cars have long been known in railroad use in North America. They generally have a main tank that serves both as a receptacle for lading, and as the primary structural element of the car. The tank is typically carried on cradles, which are themselves carried upon trucks. The tank typically has various access and auxiliary fittings such as brakes, ladders, and walkways.

SUMMARY OF THE INVENTION

In an aspect of the invention there is a railroad tank car with a low-mounted handbrake.

In a feature of that aspect of the invention, the handbrake is trackside operable. In another feature, the handbrake is side-mounted on the railroad car. In another feature, the handbrake is end-mounted on the tank car. In another feature, the handbrake is mounted in a side recess of the tank car. In another feature, the handbrake is mounted in an end recess of the tank car.

In another aspect of the invention there is a railroad tank car. The tank of the tank car has a transverse handrail mounted thereto. In a feature of that aspect of the invention, the tank car has a handbrake mounted longitudinally outboard of the handrail.

In another aspect of the invention there is a railroad tank car having a tank mounted on trucks. The tank car has a walkway located longitudinally outboard of the tank, and running transversely across the tank car. The tank car has a handbrake assembly mounted longitudinally outboard of the walkway.

In another aspect of the invention there is a railroad tank car having a tank carried on a pair of first and second tank cradles, the tank cradles being longitudinally spaced apart. The tank car has main bolsters at either end thereof. Each of the main bolsters is mounted at a truck center over a railroad car truck. Each of the cradles is mounted upon a respective one of the main bolsters. The car has jacking pads located at the laterally outermost extremities of the main bolsters. A side sill extends lengthwise outboard of the bolster. The side sill is recessed laterally inboard clear of the jacking pad.

In an aspect of the invention there is a railroad tank car having a draft sill and an end sill mounted cross-wise thereto, the end sill being asymmetric relative to the draft sill.

In a feature of that aspect of the invention the end sill has a longitudinally inboard relief located to one side of the draft sill. In another feature, a handbrake assembly is mounted at the relief. In another feature, the handbrake assembly is trackside operable. In another feature, the tank car has a tank that is free of handbrake fittings. In another feature, the end sill has a first portion and a second portion; the first portion extends to a first side of the center sill. The second portion extends to a second side of the center sill. The first portion has the relief. In another feature, the draft sill terminates at a striker plate. The first end sill portion is spaced longitudinally inboard of the striker plate. In another feature, the second end sill portion is mounted to abut the striker from behind. In another feature, a walkway surmounts the first portion of the end sill, and the handbrake assembly is mounted longitudinally outboard of the walkway. In another feature, the first and second portions of the end sill lap each other. In another feature, the second portion of the end sill extends behind the striker fully across the draft sill. In another feature, the draft sill has a top cover plate and the first portion of the end sill laps the top cover plate at a location spaced longitudinally inboard behind the striker plate. In another feature, the first portion of the end sill is formed of a hollow structural section. In another feature, the first portion of the end sill is mounted to the draft sill at a moment connection.

In another aspect of the invention, there is a railroad tank car having a draft sill terminating at a striker plate; and a first end sill portion extending transversely to a first side of the draft sill; the first end sill portion being spaced longitudinally inboard of the striker plate.

In a feature of that aspect of the invention, the end sill includes a second end sill portion extending transversely to a second side of the draft sill; the second end sill portion being mounted to abut the striker from behind. In another feature, a handbrake assembly is mounted to the first portion of the end sill. In another feature, a walkway surmounts the first portion of the end sill, and the handbrake assembly is mounted longitudinally outboard of the walkway. In another feature, the handbrake assembly is trackside operable. In another feature, the tank car has a tank that is free of handbrake fittings. In another feature, the first and second portions of the end sill lap each other. In another feature, the second portion of the end sill extends behind the striker fully across the draft sill. In another feature, the draft sill has a top cover plate and the first portion of the end sill laps the top cover plate at a location spaced longitudinally inboard behind the striker plate. In another feature, the first portion of the end sill is formed of a hollow structural section. In another feature, the first portion of the end sill is mounted to the draft sill at a moment connection. In another aspect of the invention, there is a railroad tank car having a side-mounted trackside-operable handbrake installation.

In another aspect of the invention, there is a railroad tank car. It has a tank mounted on first and second cradles, and carried upon railroad car trucks for rolling motion along railroad tracks. The first cradle extends cross-wise relative to a first draft sill of the railroad car. An end sill is spaced lengthwise outboard of the first cradle. A side-mounted handbrake assembly recessed between the first cradle and the end sill.

In a feature of that aspect of the invention, the handbrake assembly is trackside operable. In another feature, the tank car has a lateral walkway mounted to the end sill, and the handbrake assembly is recessed between the first cradle and the walkway. In another feature, the tank car has a step and ladder at an outboard end of the end sill, and the handbrake assembly is recessed between the step and the first cradle. In another feature, the tank is free of handbrake fittings. In another feature, the first cradle has a laterally outboard extremity and a longitudinally extending side sill running between the first cradle and the end sill, the side sill being laterally inboard of the laterally outboard extremity of the first cradle, and the handbrake assembly being mounted to the side sill. In another feature, an intermediate cross-member is mounted lengthwise inboard of the end sill, and the side sill has a first end supported by the first cradle, and a second end supported by the intermediate cross-member. In another feature, the first cradle has a laterally outboard extremity; an intermediate cross-member is mounted lengthwise inboard of the end sill; a longitudinally extending side sill runs between the first cradle and the end sill; the side sill having a first end mounted to the first cradle laterally inboard of the outboard extremity thereof; the side sill having a second end supported by the intermediate cross-member; a walkway mounted across the tank car, the walkway being carried by the end sill and by the intermediate cross-member; the handbrake being mounted to the side sill; and the handbrake being trackside operable.

In another aspect of the invention, there is a railroad tank car having a draft sill and an end sill mounted cross-wise thereto. The draft sill terminates at a striker. The end sill is spaced longitudinally inboard of the striker.

In a feature of that aspect of the invention, a spacer is mounted between the striker and the end sill, the spacer functioning as a backing bar of the striker and the spacer maintaining a set-back distance between the end sill and the striker.

In another aspect of the invention, there is a railroad tank car having a walkway across an end thereof, there being a handrail mounted to the tank of the railroad tank car alongside the walkway.

These and other aspects and features of the invention may be understood with reference to the description which follows, and with the aid of the illustrations of a number of examples. The various features identified above may be combined with the aspects in many combinations and permutations.

BRIEF DESCRIPTION OF THE FIGURES

The description is accompanied by a set of illustrative Figures in which:

FIG. 1b is a side view of the railroad tank car of FIG. 1a;

FIG. 1c is a top view of the railroad tank car of FIG. 1a;

FIG. 1d is an end view of the railroad tank car of FIG. 1a;

FIG. 2a is an enlarged isometric view of the 'B' end point of the railroad tank car of FIG. 1a;

FIG. 2b is a top view of the enlarged detail of FIG. 2a;

FIG. 2d is a side view of handbrake assembly seen in FIG. 2a;

FIG. 3a is an isometric view of an alternate embodiment of 'B' end point to that of FIG. 2a;

FIG. 3b is an isometric view of an alternate embodiment to that of FIG. 3a;

FIG. 4a shows an isometric general arrangement view of an alternate railroad tank car to that of FIG. 1a;

FIG. 4b is a side view of the tank car of FIG. 4a;

FIG. 4c is a top view of the tank car of FIG. 4a;

FIG. 4d is an end view of the tank car of FIG. 4a;

FIG. 5a is an enlarged view of the near corner of the 'B' end of the tank car of FIG. 4a;

FIG. 5b is a further enlarged detail of FIG. 5a; and

FIG. 5c is a top view of the enlarged detail of FIG. 5a with the tank shown in outline to reveal structural detail;

DETAILED DESCRIPTION

Figure 1A:
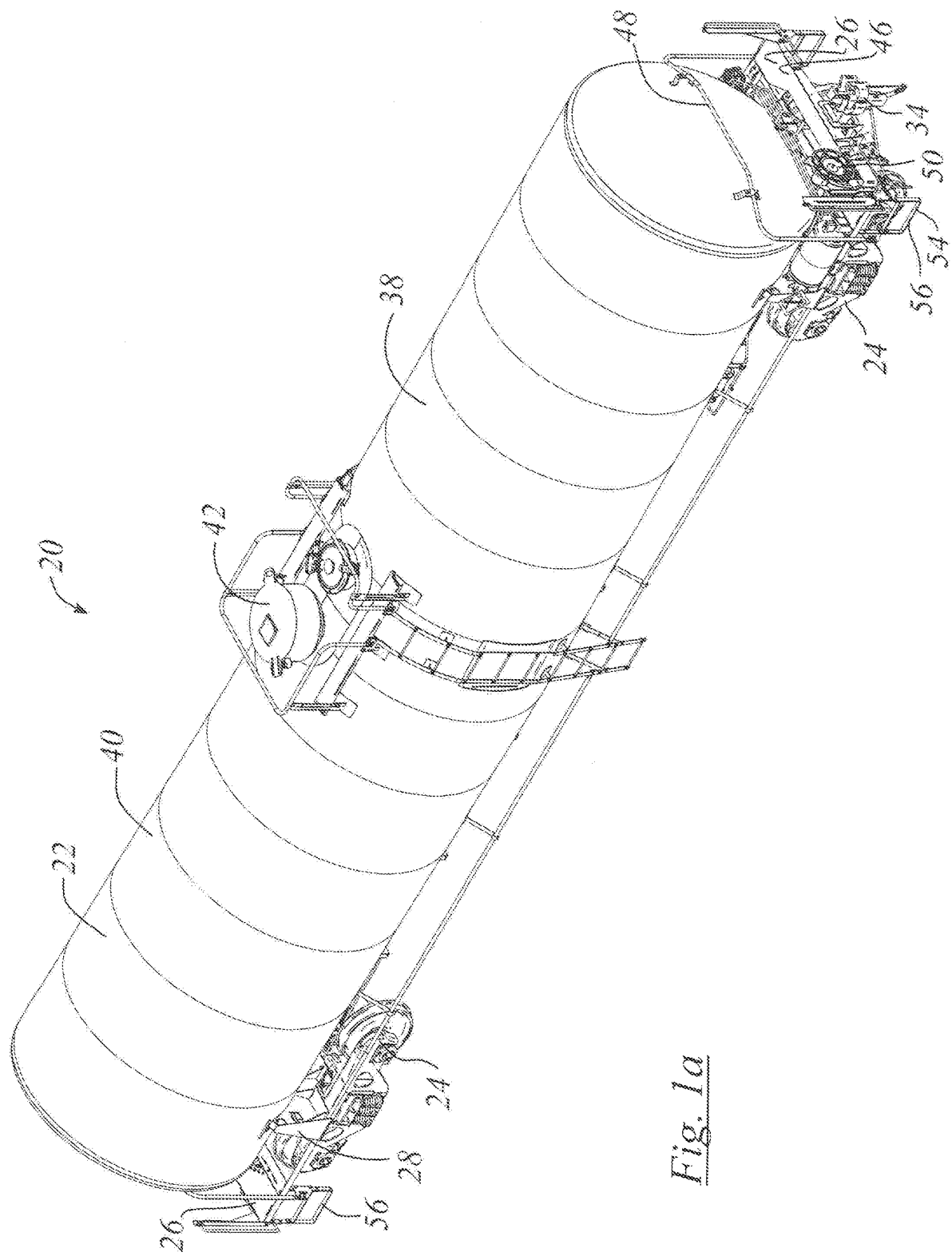
FIG. 1a is an isometric general arrangement view of a railroad tank car from the left, behind, and above the 'B' end, showing the handbrake assembly.
Figure 1D:
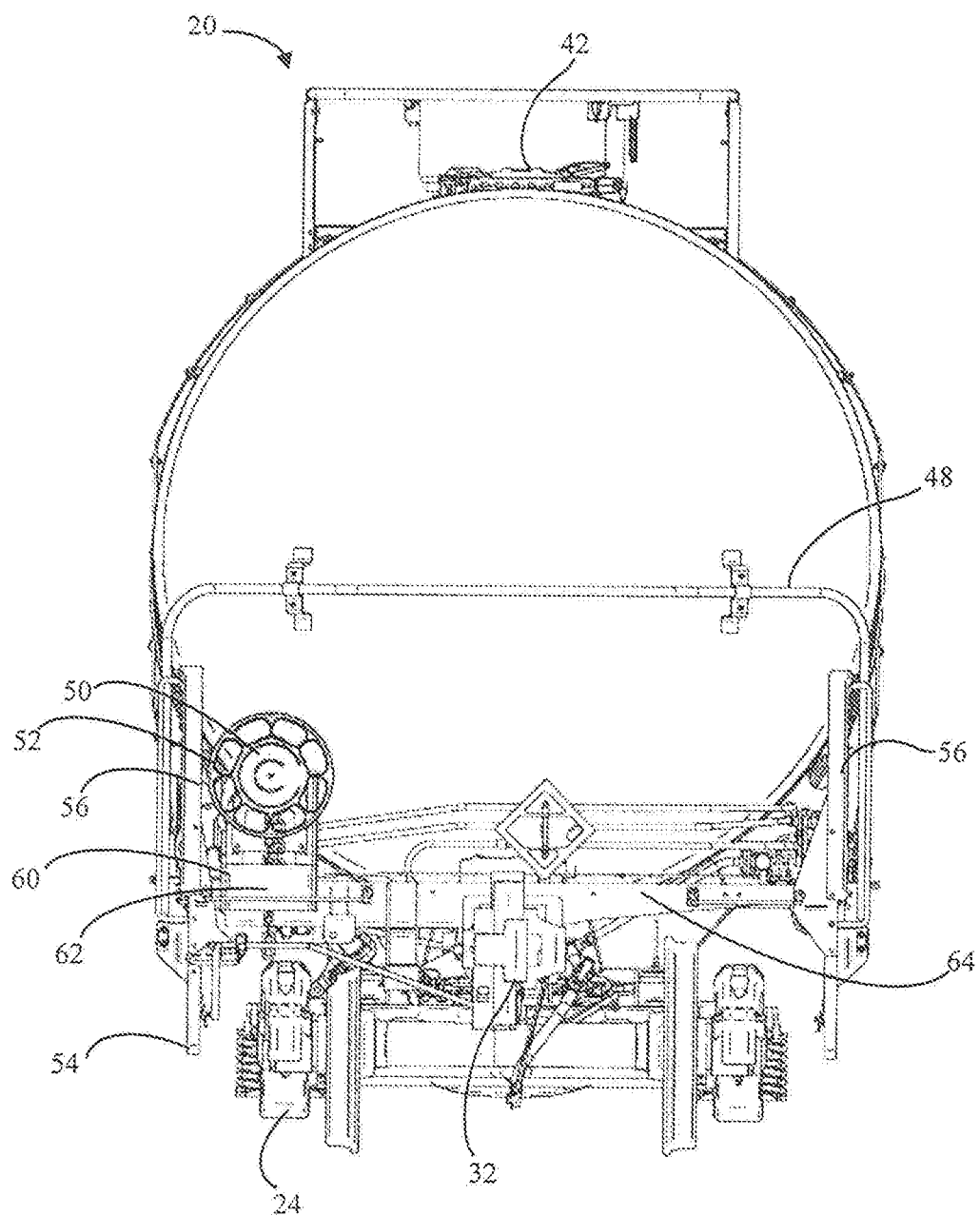
Figure 2B:
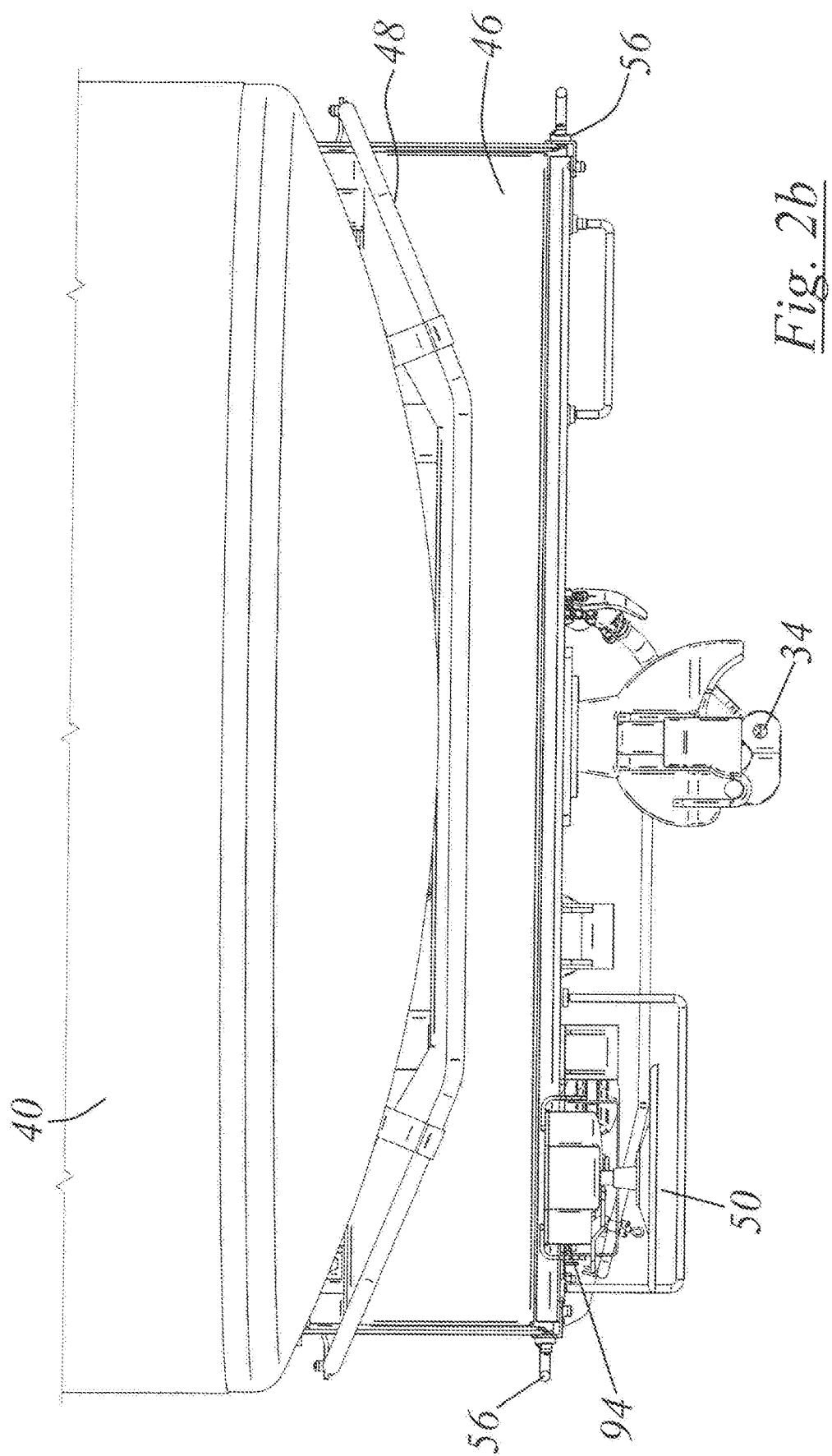
Figure 2C:
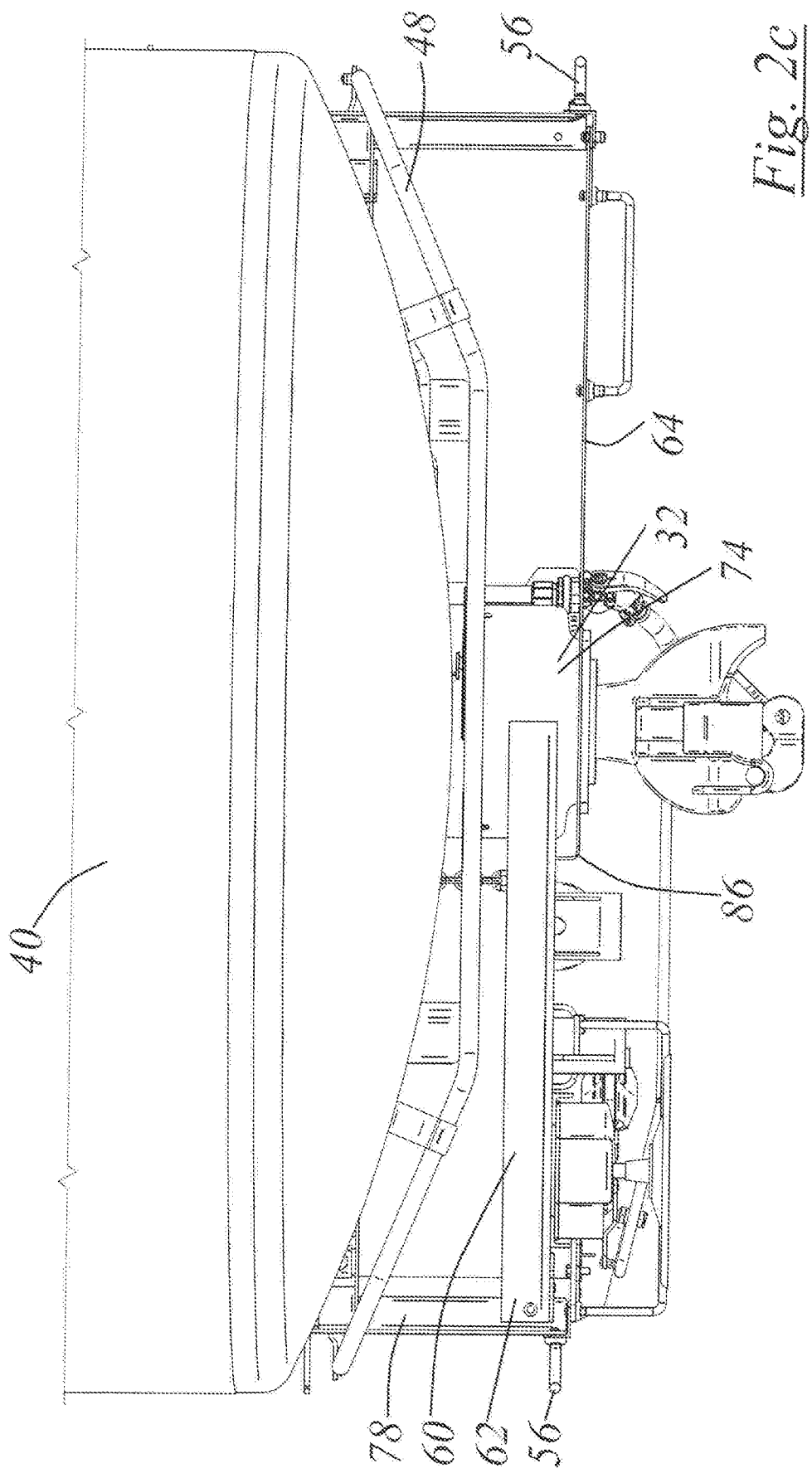
FIG. 2c is the top view of FIG. 2b with the walkway removed to reveal structure.
Figure 2D:
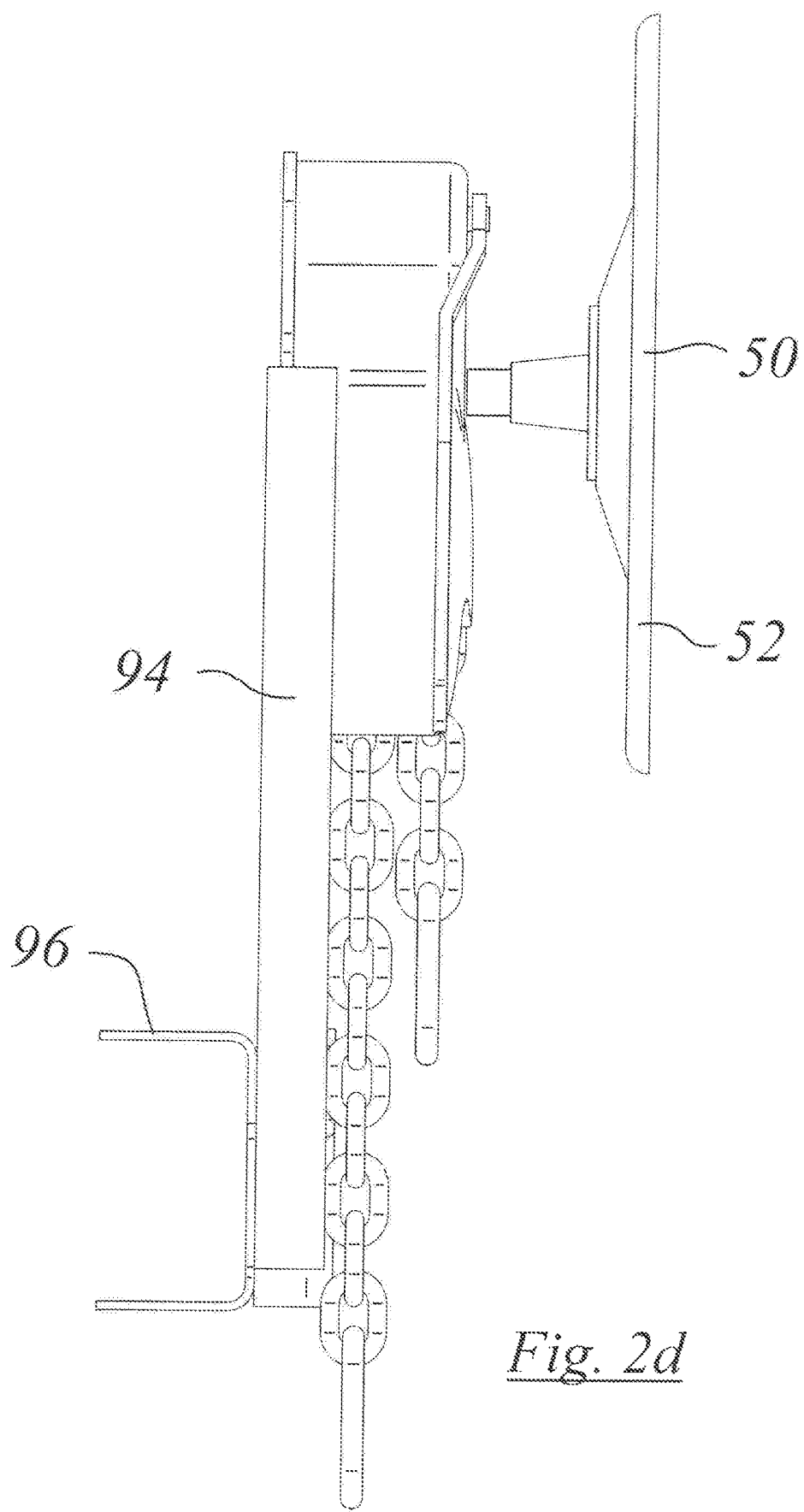

The description that follows, and the embodiments described therein, are provided by way of illustration of an example, or examples, of particular embodiments of the principles, aspects, or features of the present invention (or inventions, as may be). These examples are provided for the purposes of explanation, and not of limitation, of those principles and of the invention. In the specification, like parts are marked throughout the descriptive text and the drawings with the same respective reference numerals. The drawings are generally to scale, and may be taken as being to scale unless otherwise noted. Unless noted otherwise, the structural members of the car may be taken as being fabricated from steel.

The terminology used herein is thought to be consistent with the customary and ordinary meanings of those terms as understood by a person of ordinary skill in the railroad industry in North America. Following from decision of the CAFC in *Phillips* v. *AWH Corp.*, the Applicant expressly excludes all interpretations that are inconsistent with this specification, and, in particular, expressly excludes any interpretation of the claims or the language used in this specification such as may be made in the USPTO, or in any other Patent Office, other than those interpretations for which express support can be demonstrated in this specification or in objective evidence of record in accordance with In re Lee, (for example, earlier publications by persons not employed by the USPTO or any other Patent Office), demonstrating how the terms are used and understood by persons of ordinary skill in the art.

In terms of general orientation and directional nomenclature, for railroad cars described herein the longitudinal direction is defined as being coincident with the rolling direction of the railroad car, or railroad car unit, when located on tangent (that is, straight) track. In the case of a railroad tank car, the longitudinal direction is parallel to the tank car cylinder. Unless otherwise noted, vertical, or upward and downward, are terms that use top of rail, TOR, as a datum. In the context of the car as a whole, the term lateral, or laterally outboard, or transverse, or transversely outboard refer to a distance or orientation relative to the longitudinal centerline of the railroad tank car, or car unit, or of the centerline of a centerplate at a truck center. The term "longitudinally inboard", or "longitudinally outboard" is a distance taken relative to a mid-span lateral section of the tank car.

The commonly used engineering terms "proud", "flush" and "shy" may be used herein to denote items that, respectively, protrude beyond an adjacent element, are level with an adjacent element, or do not extend as far as an adjacent element, the terms corresponding conceptually to the conditions of "greater than", "equal to" and "less than". The directions correspond generally to a Cartesian frame of reference in which the x-direction is longitudinal or lengthwise, the y-direction is lateral or cross-wise, and the z-direction is vertical. Inasmuch as this specification relates to a tank car, there may be a co-ordinate system based on the tank, namely an axial direction that is the same as the longitudinal rolling direction, a radial direction extending away from the axial direction vector along the tank centerline, and a circumferential or peripheral direction.

Given that the railroad tank car described herein may tend to have both longitudinal and transverse axes of symmetry, a description of one half of the car may generally also be intended to describe the other half as well, allowing for differences between right hand and left hand parts. The abbreviation kpsi stands for thousand of pounds per square inch. To the extent that this specification or the accompanying illustrations may refer to standards of the Association of American Railroads (AAR), such as to AAR plate sizes, those references are to be understood as at the earliest date of priority to which this application is entitled.

FIG. 1a shows a side elevation view of an example of a railroad tank car 20 that is intended to be representative of a wide range of tank cars in which the present invention may be incorporated. Car 20 may be suitable for a variety of uses. By way of a general overview, a tank car 20 may have a tank shell, or car body 22 that is carried on trucks 24 for rolling operation along railroad tracks. Car body 22 may have first and second end sections 26. Each end section 26 seats on a respective truck 24. Each end section includes a cradle 28, a cross-wise extending main bolster 30 upon which cradle 28 is supported, and a lengthwise running stub sill that includes a draft sill 32 and coupler 34. Main bolster 30 is mounted cross-wise to the stub sill at the truck center, $CL_{Truck}$.

A lading containment vessel in the nature of a tank 40 may seat on cradles 28. Tank 40 may have a generally cylindrical shell 38 of formed and welded steel plates. Tank 40 may also have various valves and fittings, such as a top valve assembly, indicated generally as 42. Tank 40 may also have other protruding fittings such as a bottom outlet valve (BOV) 44 that stands outwardly proud of steel shell 38. Tank 40 may have a reinforcement, or reinforcements. These reinforcements may have the form of doublers, or pads, or strips, or bars that run in the longitudinal or lengthwise, or axial direction along the belly of tank. The bars may be spaced apart in the circumferential direction, and may be located symmetrically to either side of the vertical centerline plane of tank. This structure is shown and described in co-pending U.S. patent application Ser. No. 14/799,163 filed Jul. 14, 2015 and published as US Pubn. 2017/0015333 on Jan. 19, 2017, the specification and drawings thereof being incorporated by reference herein to any extent helpful or necessary.

As may be understood, the primary structure of car 20, and of tank 40, is predominantly symmetrical with respect to both the longitudinal centerline vertical plane of car 20 and with respect to the transverse central vertical plane. That is, car 20 has first and second ends. There is a draft sill 32 at each of the first and second ends. There are respective first and second main bolsters 30 that extend cross-wise to the draft sills at each end of the car. Each end of car 20 has a cradle 28 mounted atop main bolster 30. Typically, each cradle 28 is mounted on top of one of the main bolsters 30, effectively forming a single structural support unit for that end of car 20. The laterally outboard end of cradle 28 or of the combined cradle/bolster structure, however it may be termed, extends laterally outboard of truck 24, and has, at its outermost extremity a downwardly facing jacking pad 36. Jacking pad 36 provides a hard point at which the car may be lifted for whatever reason. A typical reason is to permit the end of the car to be lifted to permit the installation or replacement of a truck 24.

In railroad cars generally, one end of the car is designated as the 'A' end, and the other end is the 'B' end. In railroad terminology, the handbrake is found at the 'B' end of the car. In respect of the brake mountings, the car is not symmetrical. Consider the 'B' end as being the first end of car 20, and the 'A' end as being the second end. The handbrake is typically set while car 20 is stationary. Handbrake assembly 50 herein is a low-mounted handbrake assembly that is at a height for trackside operation. That is, "trackside operation" means that whether end-mounted or side-mounted, the handbrake handle or wheel 52 is at a height suitable for the handbrake to be set, or released, by a person of average size standing at track height or standing on the first step 54 (i.e., the lowest step) of the footstep or access ladder 56 located at the point (i.e., corner) of the car at which the handbrake is mounted. This may be understood in contrast to conventional tank car handbrakes that have, in the past, been mounted to the structure of the tank, requiring the operator to climb up on the car and to operate the handbrake by turning the hand wheel while standing on the catwalk running across the end of the car. The surface of the catwalk is typically higher than the level of the top cover of the draft sill, which is generally more than 41 inches above Top of Rail. The center of handbrake wheel 52 may be between 26 inches and 61 inches above TOR.

In the embodiments herein, tank 40 is free of handbrake fittings. A catwalk, or cross-wise extending walkway 46 runs across the end of the end of the car from side to side. A handrail 48 is mounted to the end of tank 40 and runs beside walkway 46 across car 20. Walkway 46 is longitudinally outboard of handrail 48. Brake assembly 50 is mounted outboard of walkway 46.

Considering car 20 of FIGS. 1a-1c, there is an end sill, 60 that extends cross-wise relative to draft sill 32. End sill 60 is not symmetrical. End sill 60 has a first portion 62 and a second portion 64. First portion 62 extends to one side of draft sill 32, which may be the left hand side. Second portion 64 extends to the other side of draft sill 32, which may be the right hand side. Draft sill 32 terminates at a longitudinally outboard end at which a striker 66 is mounted, typically by welding. Coupler 34 extends outwardly away from striker 66. In the embodiment of FIGS. 2a-2d, draft sill 32 has a lower cover plate 72, a top cover plate 74 and left and right hand vertical webs 76. A tank stop, or abutment 70 is secured to top cover plate 74, abutment 70 having a cushion 68 against which tank 40 seats. A side sill 78 extends between the respective outboard ends of main bolster 30 and cradle 28.

An intermediate stringer or sill or cross-member 80 is located longitudinally between end sill 60 and main bolster 30. Cross-member 80 is of generally light construction for the purpose of supporting walkway 46. Cross-member 80 is located generally at the same longitudinal station as abutment 70. Cross-member 80 has first and second, left-hand and right-hand, portions 82, 84. First portion 82 extends laterally outboard away from abutment 70, being secured to top cover plate 74 at its inboard end, and to side sill 78. Second portion 84 likewise extends from top cover plate 74 to the opposite side sill. Walkway 46 is supported on its inboard margin by intermediate cross-member 80, and on its longitudinally outboard margin by end sill 60.

Second portion 64 of end sill 60 is mounted immediately inboard of, and provides structural backing behind the upwardly extending flange of striker 66. The laterally outboard end of first portion 64 mates with the end of right hand side sill 78 at the right hand ladder 56. The inboard end of second portion 64 runs across the full width of striker 66, and extends beyond it by an overlap distance roughly twice as great as the width of the side flange of striker 66. The end of the overlapped section is folded as a tab, or spacer, as at 86.

First portion 62 of end sill 60 is mounted longitudinally inboard of second portion 64, and is accordingly spaced inwardly of striker 66 by the extent of tab 86. First portion 62 is of greater second moment of area, and of greater cross-sectional area, than second portion 64, and may have the form of a hollow structural steel tube. The inboard end of first portion 62 overlaps top cover plate 74 to permit a moment connection to be made. The overlap may be about half the width of top cover plate 74. The inboard end of first portion 62 may have a notch or rabbet cut therein to conform to the profile of top cover plate 74 and near-side web 76. The outboard end of first portion 62 may be mated with near-side side sill 78 at near side ladder 56. The coupler release arm bracket 88, and coupler release rod 92, are mounted to the longitudinally outboard side of ladder 56.

The rearward, or inward, offset of first portion 62 relative to the back face of striker 66 creates an accommodation, or recess, which may be identified as handbrake assembly recess 90. The depth of the recess in the x-direction corresponds to the extent of tab 86. As suggested by the name, the base or pedestal 94 of handbrake assembly 50 is mounted to first portion 62 at its outboard end adjacent to ladder 56, the assembly being mounted therein using mechanical fastening hardware. Fitting 96 of pedestal 94 mates with first portion 62 in recess 90. Walkway 46 is then secured on top of first portion 62, inboard of handbrake assembly 50. Handbrake assembly, as so mounted, is trackside operable. First portion 62 is shown as being a straight member with a disjointed-step at the center sill from second portion 64. In other embodiments, end sill 60 may have the form of a continuous section that has been formed, by pressing, casting, or other means, to have a dog-leg, or bow, or accommodation or recess formed therein to accommodate handbrake assembly 50.

Figure 3B:
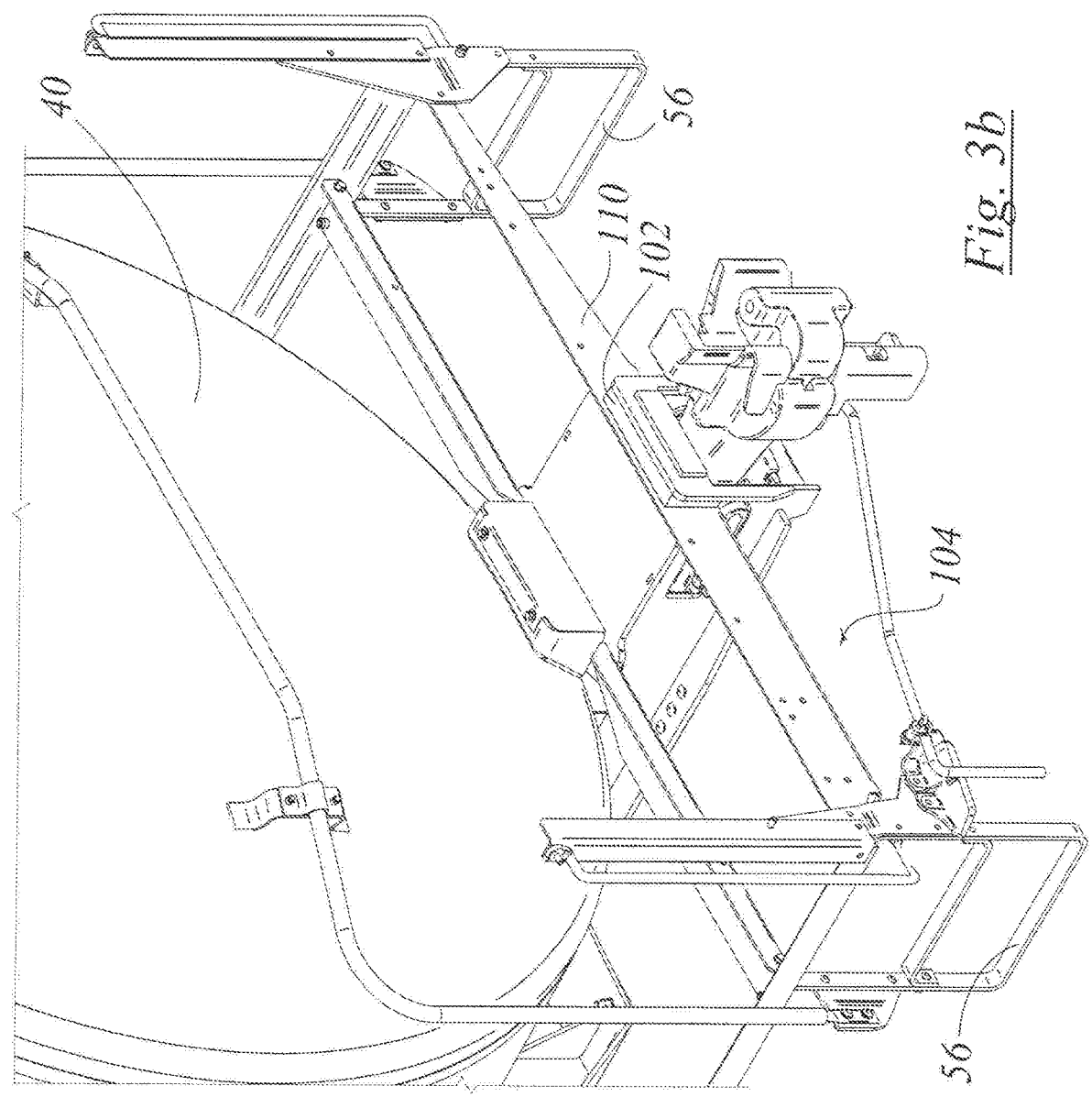
Figure 3C:
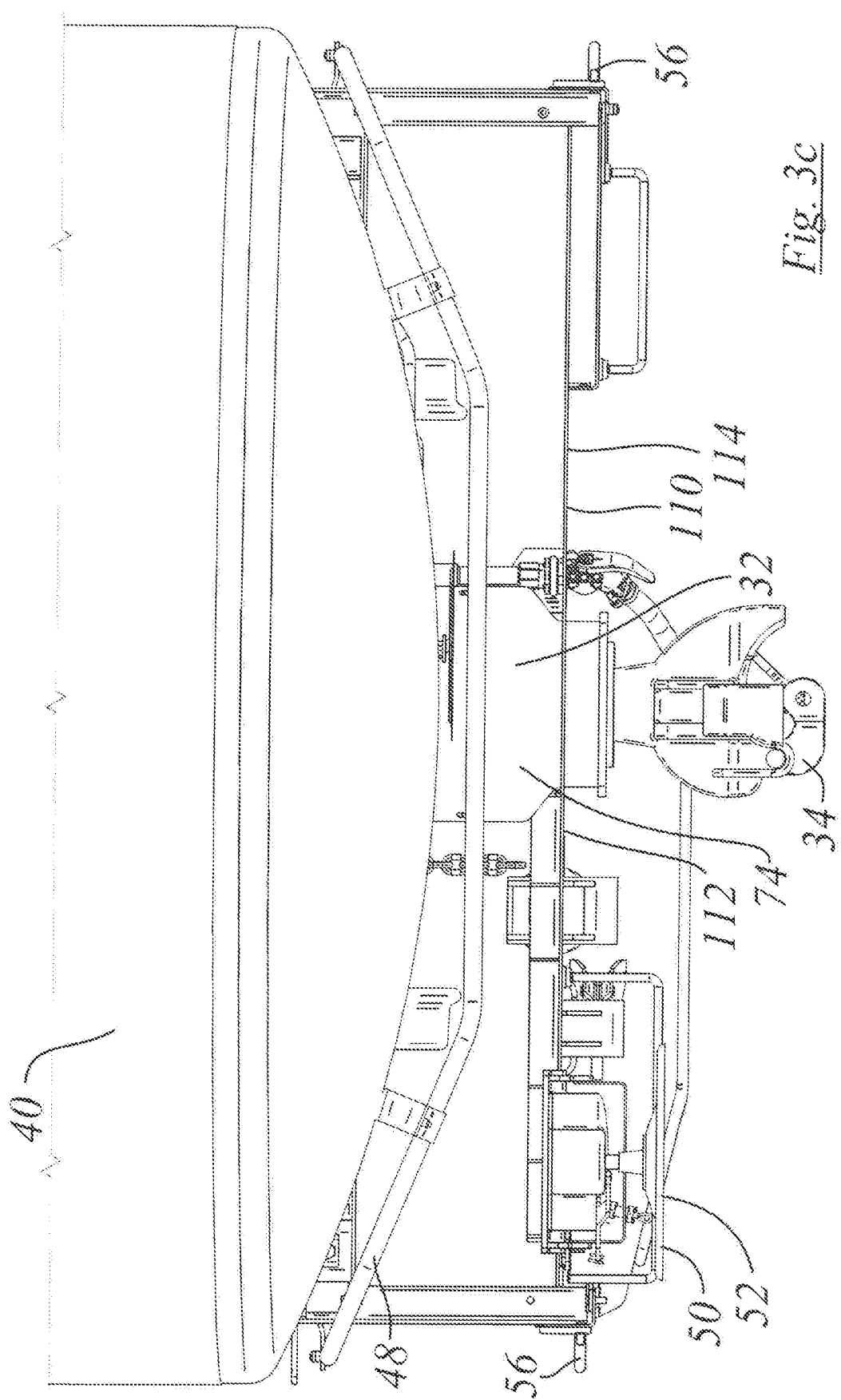
FIG. 3c is a top view of the embodiment of FIG. 3b with the walkway removed.
Figure 3D:
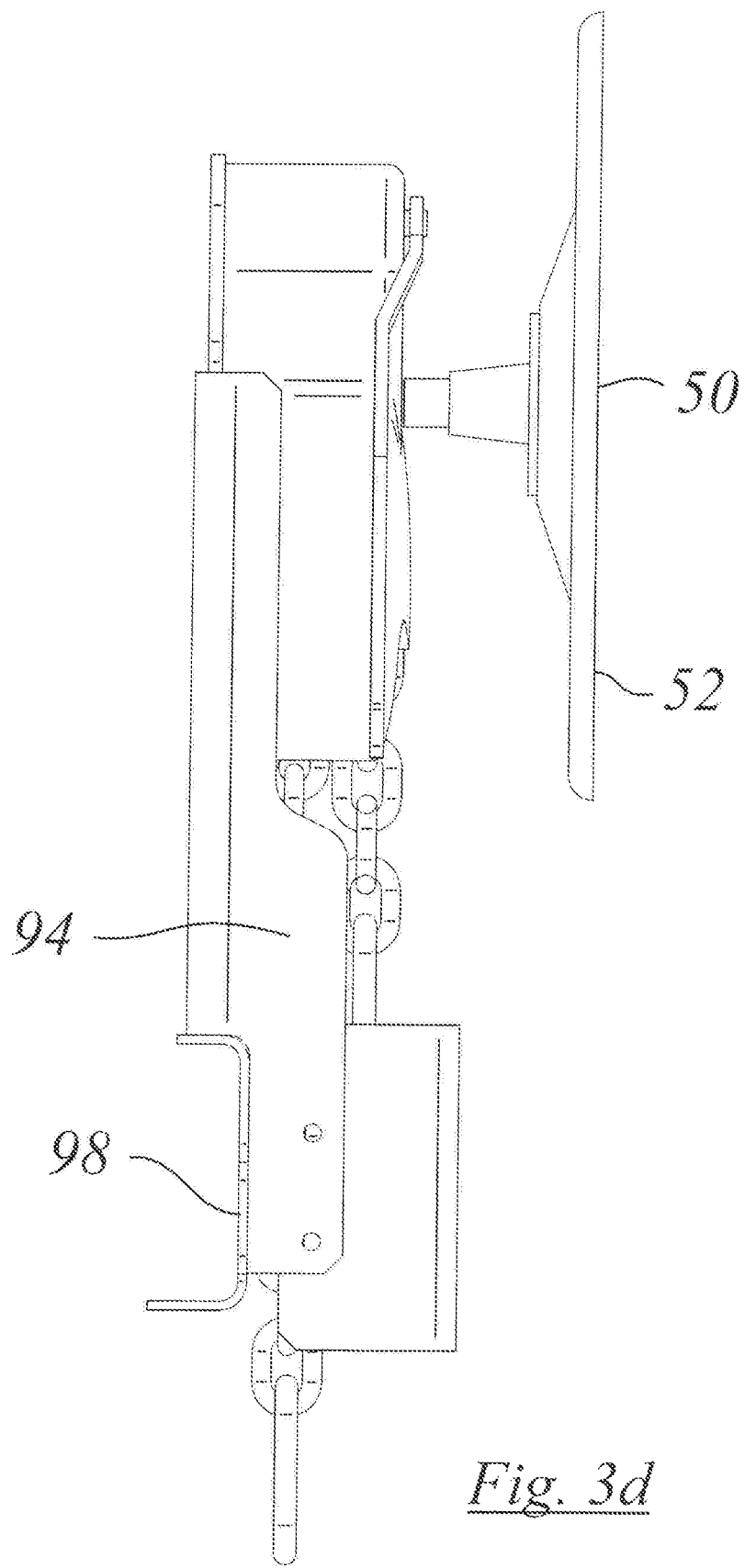
FIG. 3d is a side view of the handbrake assembly seen in FIG. 3c.
Figure 4A:
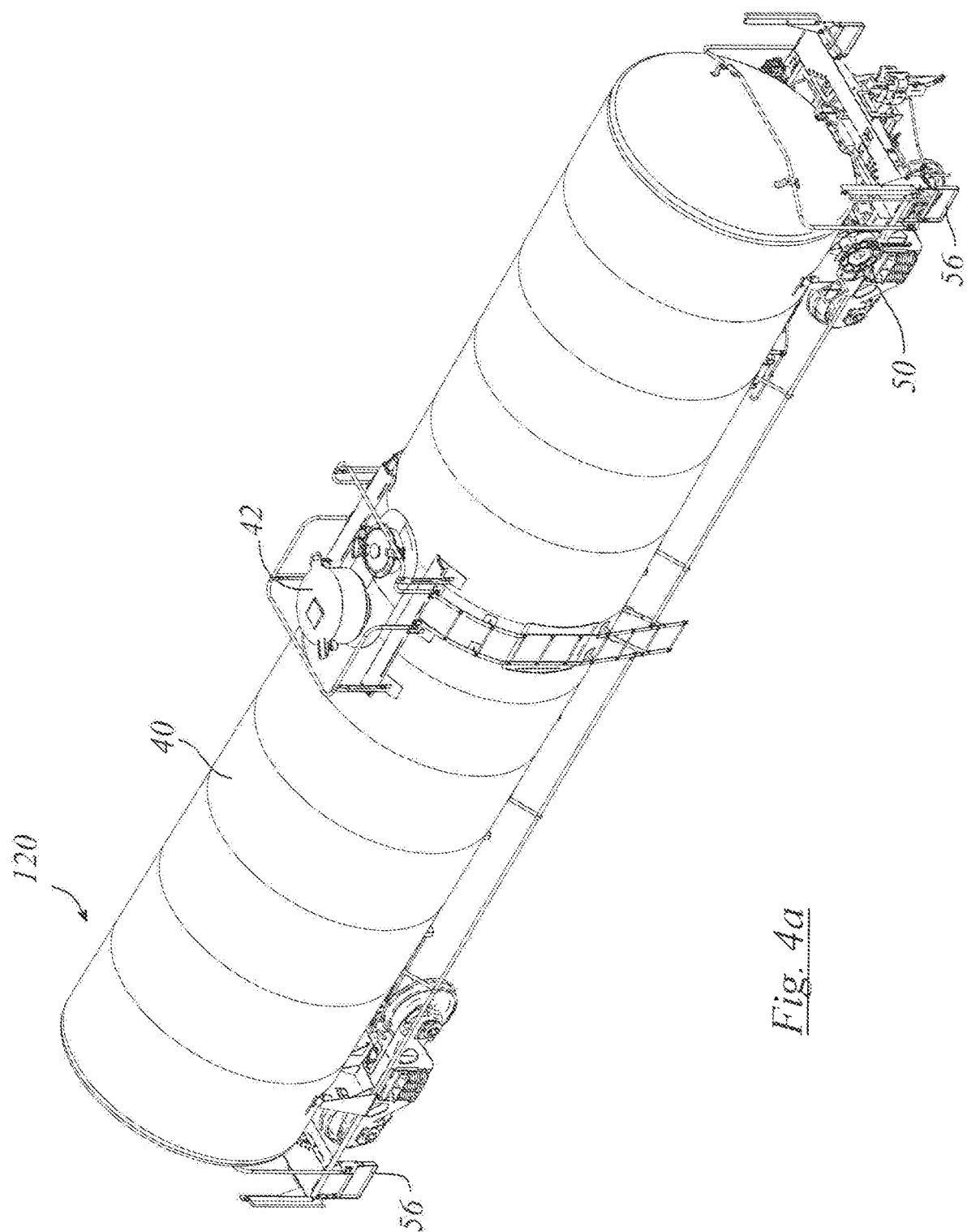
Figure 4D:
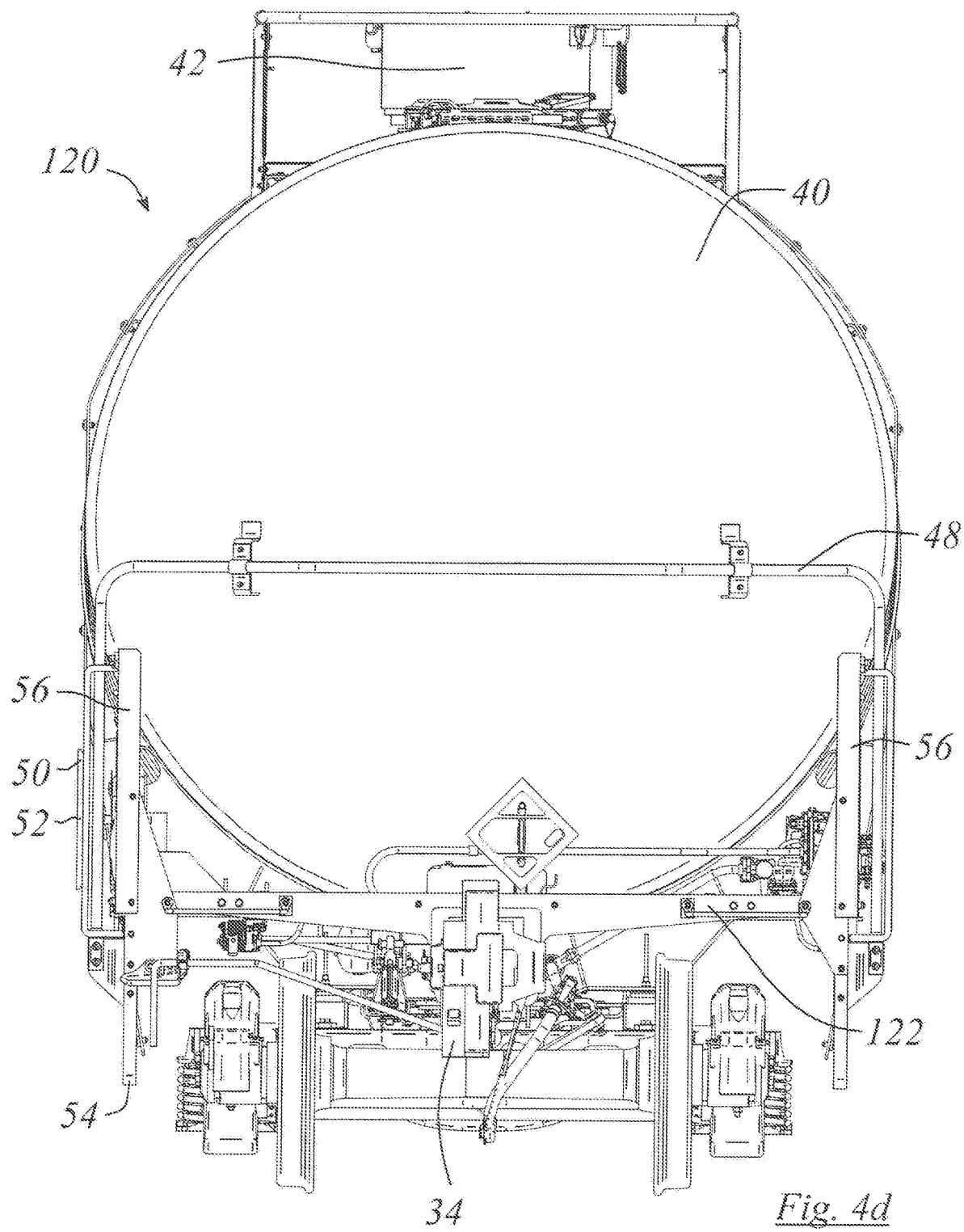
Figure 5B:
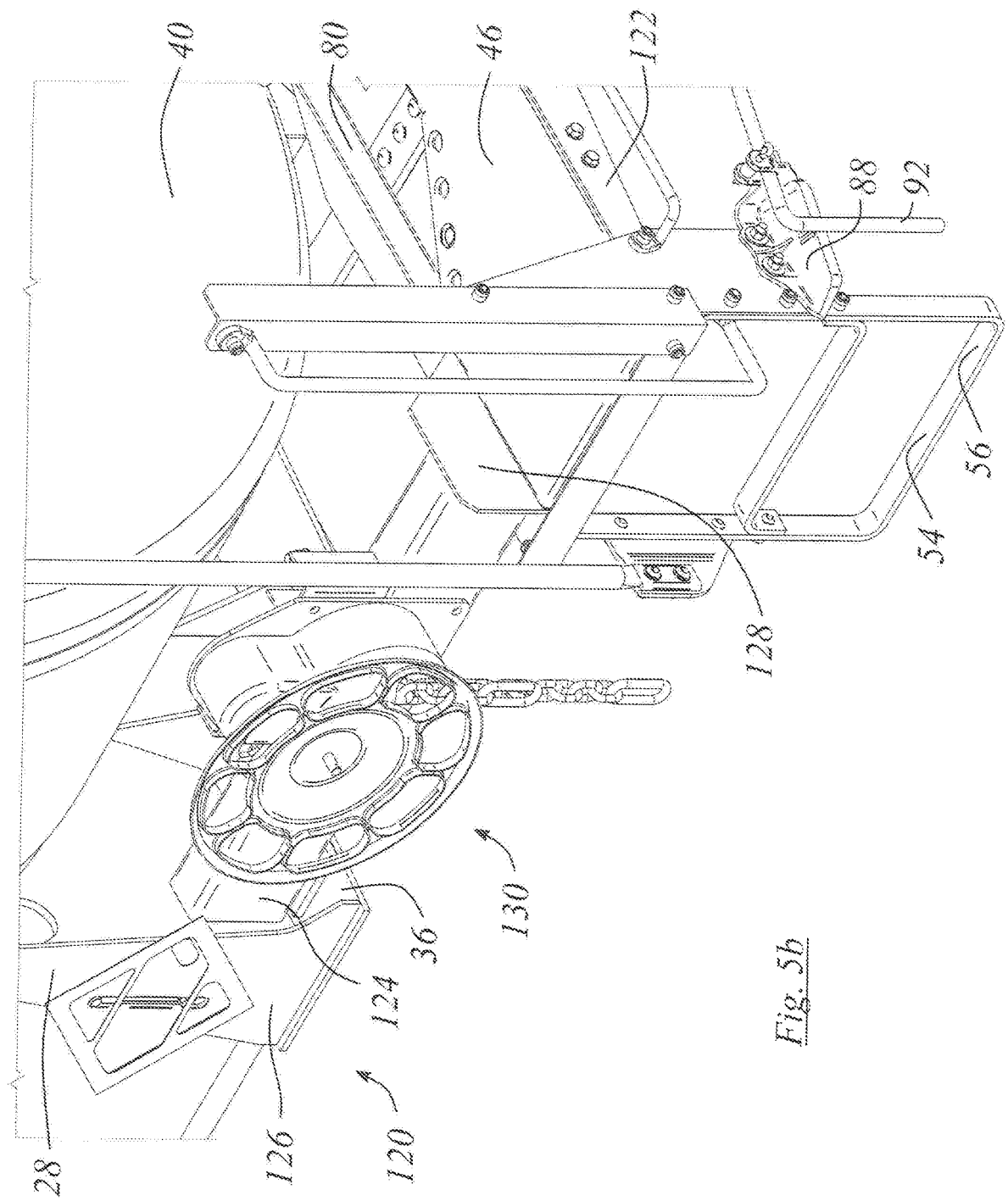

In another embodiment of handbrake assembly installation, shown in FIGS. 3*a* and 3*c*, dog-legged or stepped end sill 60 is replaced by a straight-through end sill 100 of constant cross-section (which may be a hollow structural section). In this example, however, a spacer in the form of a backing bar, or backing stub 102 is mounted to the rear face of the upper flange of striker 66. Stub 102 may be a solid bar, or a hollow structural section. The thickness of stub 102 in the x-direction of car 20 corresponds to the size of tab 86, and corresponds to the longitudinal-direction depth of the relief or accommodation 104 formed between striker 66 and ladder 56. Handbrake assembly 50 is mounted to the left hand outboard end of end sill 100 in the same manner as before. Fitting 98 of pedestal 94 of handbrake assembly 50 mates with end sill 100 in recess or relief or accommodation 104. Handbrake assembly 50, as so mounted, is trackside operable.

FIG. 3*b* shows an alternate version of end sill 110 differing from end sill 100. End sill 100 has a first, or left-hand portion 112 and a second, or right-hand portion 114. Second portion 114 may have the form of a vertical web. First portion 112 may have upper and lower formed flanges as at 114, yielding an angle or channel section to which fitting 98 is attached. End sill 100 is accordingly asymmetric relative to the car centerline.

In another embodiment of railroad tank car 120, seen in FIGS. 4*a*-4*d* and 5*a*-5*e*, handbrake assembly 50 is side mounted, longitudinally inboard of ladder 56. That is, end section 118 has a straight-though end sill 122 that is mounted immediately behind, and is a backing for, striker 66. In this embodiment there is a side sill 124 that extends between main bolster 30 and cradle 28 to intermediate cross-member 80. In this embodiment, side sill 124 is stepped laterally inboard relative to the position of side sill 78 on the opposite side of the car, or of side sills 78 on car 20 described above. The inward step, or deviation, defines a space, o recess, or accommodation 130 that is comparable to accommodation or recess 90 in terms of depth, and is such as to permit handbrake assembly 50 to be mounted in recess 130 adjacent to ladder 56, in the lee of overhanging tank 40. Side sill 124 is mounted inboard of the position of jacking pad 36, being tucked laterally within outside flange 126 of cradle 28. Handbrake assembly 50, as so mounted, is trackside operable. Side sill 124 may be a hollow structural section. The end of side sill 124 may be capped at one end by the main bolster web, and at the other end by an end cap 128 that mates with intermediate cross-member 80.

As described above, this disclosure pertains to the application of a offset end sill or offset side sill low mount handbrake to a tank car. There are two options for a low mounted handbrake: mounted to the end of the car between the stub sill and the side sill or mounted on the side of the car between the bolster and the end sill.

The end-mounted low mount handbrake is mounted to the end sill of the car. The end sill is normally mounted directly behind the striker and connects from side sill to side sill serving as a support for the end platform. To mount the handbrake to the end sill, the end sill is offset towards the center of the car i.e., toward the truck center and away from the striker. The offset end sill achieves the required dimensional spacing to permit location of the handbrake. There are two options to offset the end sill. A first option, as described above in connection with FIGS. 3*a*-3*c*, is to offset the end sill as a whole. The second option is to offset just the portion between the stub sill and the side sill in the "BL" corner of the car, as in FIGS. 2*a*-2*d*. Thus the offset end sill is a beam that connects the stub sill to the side sill of the car. The offset end sill beam can be continuous from side sill to side sill or can be only from the stub sill to the side sill. The offset end sill beam could either be a hollow structural tube (HSS) or a fabricated closed section beam. The beam carries both the vertical load from the handbrake and the torsional load created by the eccentric load of the handbrake relative to the neutral axis of the beam.

In the other alternative embodiment, as shown in FIG. 5*a* et seq., the side mounted low mount handbrake is mounted to the side sill of the car. The side sill on a tank car provides a connection between the bolster and the end sill of the car. The offset portion of the side sill is between the bolster and the end platform, i.e., between the bolster and the intermediate cross-member. To mount the handbrake and keep it within the AAR clearance diagram the side sill is offset from the bolster end plate. The offset side sill beam may be a hollow structural tube (HSS) or a fabricated box section. The offset side sill serves as the structural support beam for the handbrake. The beam carries both the vertical load from the handbrake and the torsional load created by the eccentric load of the handbrake relative to the neutral axis of the beam. The offset side sill is connected to the tank car body bolster and the side sill will serve as a support for the jacking loads.

In both the offset side sill and offset end sill cases the structural members may be attached to the car body by welding or by the use of mechanical fasteners. There may be other methods of attachment of the side sill and end sill such as adhesives but these are generally not suitable in a railroad environment. The handbrake is mounted to either the side sill or the end sill with brackets. These brackets are mechanically fastened to the side sill, or end sill, as may be, rather than welded.

Traditionally the handbrake on a tank car is mounted on either the head of the tank or the tank head shield. The brackets in the traditional handbrake location were welded to the car structure, typically either to the tank head or to the tank head shield. Mounting the handbrake in this location forced the operator to climb onto the end platform of the car to set or release the handbrake. Whenever an operator has to climb onto a car there is the risk of a slip or fall that could result in an injury. The railroad industry, mainly the railroads and facilities that handle cars, has a desire to have handbrakes located on the car such that it can be operated from track level when the car is stationary and from the sill step when the car is in motion reducing the risk of slips and falls. Side mounted handbrakes are mounted low so that they can be operated from the sill step or from trackside. Handbrakes have not been located in these positions in the past due to geometric constraints mainly trying to keep the stub center sill as short as possible and the area that is occupied by the control valve and the reservoir to a minimum.

A low installation handbrake assembly may tend to allow personnel to traverse the car without going around the handbrake. The offset end sill or offset side sill installation may tend to allow for an easier application of the handbrake mounting brackets. The mounting brackets will be located to mate with holes located in the recessed sills and brackets, which may in turn allow for a more consistent placement of the handbrake itself. Currently, the tank head shields float with the tank jacket, whereas the stub sill and side sill is controlled by tighter tolerances (i.e. length over strikers). The handbrake installation may also tend to facilitate installation and checking of the bell crank.

Another option may include designing structural members that support the application of the handbrake from the side of the car as opposed to the end of the car. A different structural section or method of making and assembling the structural sections connect together could be considered. For example, the end sill may be welded or otherwise mechanically fastened to side sill or to the stub sill top cover, as may be. The draft arm length may change to provide more room for the handbrake on the end of the car. Lengthening the car, however, may not be desired. The offset end sill may span to both sides of the car or one side of the car. The offset end sill may be used on both ends of the car.

Various embodiments have been described in detail. Since changes in and or additions to the above-described examples may be made without departing from the nature, spirit or scope of the invention, the invention is not to be limited to those details.

We claim:

1. A railroad tank car having a longitudinal centerline, a draft sill and an end sill mounted cross-wise to said draft sill, said end sill being asymmetric relative to said draft sill, said end sill being asymmetric relative to the longitudinal centerline and said end sill has a relief located to one side of said draft sill, said relief extending longitudinally inboard.

2. The railroad tank car of claim 1, wherein a handbrake assembly is mounted in said relief.

3. The railroad tank car of claim 2, wherein said handbrake assembly is configured to be trackside operable.

4. The railroad tank car of claim 1, wherein said tank car has a tank, said tank being free of handbrake fittings.

5. The railroad tank car of claim 1, wherein said end sill has a first portion and a second portion; said first portion extends to a first side of said draft sill; said second portion extends to a second side of said draft silt and said first portion has said relief.

6. The railroad tank car of claim 5, wherein said draft sill terminates at a striker; and said first end sill portion is spaced longitudinally inboard of said striker.

7. The railroad tank car of claim 6, wherein said second end sill portion is mounted to abut said striker from behind.

8. The railroad tank car of claim 5, wherein a walkway surmounts said first portion of said end sill, and said handbrake assembly is mounted longitudinally outboard of said walkway.

9. The railroad tank car of claim 6, wherein a relief is formed between said first end sill portion and said striker, and a handbrake assembly is mounted to said first end sill portion in said relief longitudinally inboard of said striker.

10. The railroad tank car of claim 9, wherein said handbrake assembly is configured to be trackside operable.

11. The railroad tank car of claim 9, wherein a walkway surmounts said first portion of said end sill, and said handbrake assembly is mounted longitudinally outboard of said walkway.

12. The railroad tank car of claim 11, wherein said tank car has a tank, and a transverse handrail is mounted to said tank of the tank car beside said walkway longitudinally inboard of the handbrake assembly.

13. The railroad tank car of claim 1, wherein said railroad tank car has a tank mounted on trucks, said tank car has a walkway located longitudinally outboard of said tank, and running transversely across said tank car; said tank car has a handbrake assembly mounted longitudinally outboard of said walkway.

14. The railroad tank car of claim 1, wherein:
said end sill has a first portion and a second portion;
said first portion extends to a first side of said draft sill;
said second portion extends to a second side of said draft sill;
said first portion has a longitudinally inboard relief located to said first side of said draft sill;
said handbrake assembly is mounted in said relief; and
said relief extending longitudinally inboard relative to said second portion of said end sill.

15. The railroad tank car of claim 14, wherein said handbrake assembly includes a hand brake wheel mounted in said longitudinally extending inboard relief, said hand brake wheel has a center that is located between 26 and 61 inches above Top of Rail; and said handbrake wheel is configured to be trackside operable.

16. A railroad tank car, said tank car having a longitudinal centerline, said railroad tank car comprising:
a railroad car body having a tank car tank;
said car body of said tank car being mounted on railroad car trucks for rolling motion longitudinally along railroad car tracks;
a draft sill rigidly mounted at one end of said car body; and
an end sill rigidly mounted cross-wise to said draft sill;
said end sill extending cross-wise to either side of the longitudinal centerline
said end sill extending cross-wise to either side of said draft sill;
said end sill being asymmetric relative to the longitudinal centerline of said tank car;
said end sill being asymmetric relative to said draft sill; and
said end sill having a first portion extending laterally to a first side of said draft sill; and said end sill having a second portion extending laterally to a second side of said draft sill; said first portion of said end sill defining a hand brake accommodation that extends longitudinally inboard relative to said second portion of said end sill.

17. The railroad tank car of claim 16, further comprising:
first and second end sections; and
first and second cradles mounted to said first and second end sections respectively;
said tank car tank being mounted to said first and second cradles;
said first and second end sections being carried on said railroad car trucks;
said first end section having said draft sill;

said draft sill extending longitudinally outboard of said first cradle;

said draft sill being rigidly fixed relative to said tank car tank;

said first portion of said end sill being different from said second portion of said end sill, whereby said end sill is asymmetric relative to said draft sill.

18. The railroad tank car of claim 16, wherein said end sill is attached by one of (a) welding; and (b) mechanical fasteners.

19. The railroad tank car of claim 17, wherein a hand brake wheel is mounted in said accommodation, and said hand brake wheel has a center that is located between 26 and 61 inches above Top of Rail.

* * * * *